United States Patent

Doll

[11] 3,901,958
[45] Aug. 26, 1975

[54] METHOD AND APPARATUS FOR FORMING FOAMED PLASTIC ARTICLES

[75] Inventor: Gregory W. Doll, Patterson, N.C.

[73] Assignee: Cellu Products Company, Patterson, N.C.

[22] Filed: Mar. 23, 1973

[21] Appl. No.: 344,337

[52] U.S. Cl. .............. 264/45.5; 264/46.1; 264/98; 425/133; 425/326 B
[51] Int. Cl. ........................................... B29d 27/00
[58] Field of Search .................... 264/46.1, 98, 45.5,

[56] References Cited
UNITED STATES PATENTS

| | | | |
|---|---|---|---|
| 3,058,161 | 10/1962 | Beyer et al. | 264/47 |
| 3,159,693 | 12/1964 | Plymale | 264/93 |
| 3,457,337 | 7/1969 | Turner | 264/173 |

*Primary Examiner*—Melvyn I. Marquis
*Assistant Examiner*—H. H. Fletcher
*Attorney, Agent, or Firm*—Parrott, Bell, Seltzer, Park & Gibson

[57] ABSTRACT

A method and apparatus for forming foamed plastic articles wherein a heated foamable plastic material is extruded through an annular orifice to form a tubular parison, and the parison is then blow molded into a desired configuration. Provision is made for maintaining the parison under sufficient pressure to prevent the foaming of the plastic material during the extrusion and blow molding operations, and the pressure is then released to cause the foamable plastic material to foam. The resulting foam may completely fill the mold to form a solid article, or it may only partially fill the mold to form a hollow article. Also, the parison may comprise two or more concentric tubular members, some of which comprise a non-foamable plastic material to form a non-porous skin which is laminated to the foamed layer.

13 Claims, 10 Drawing Figures

PATENTED AUG 26 1975

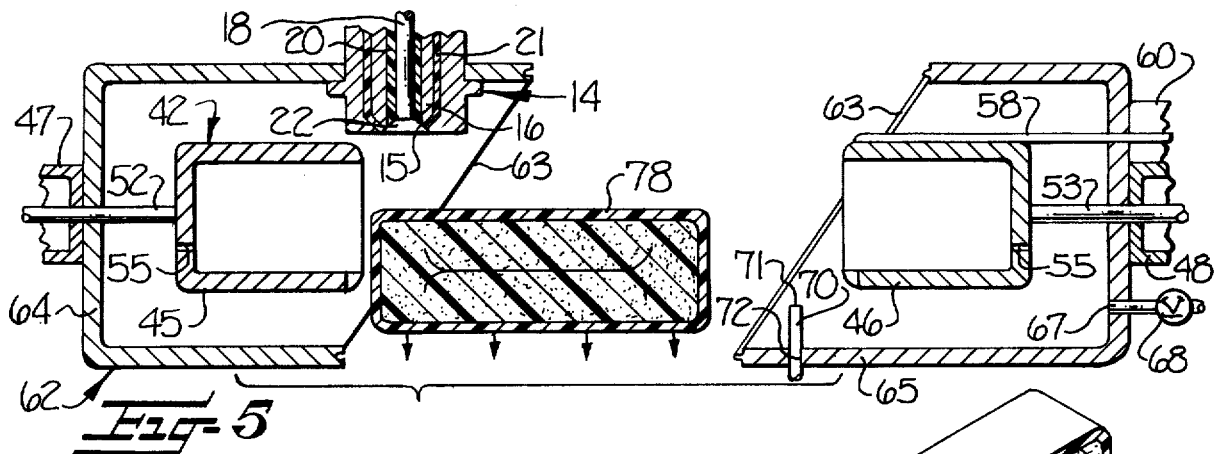
Fig-5
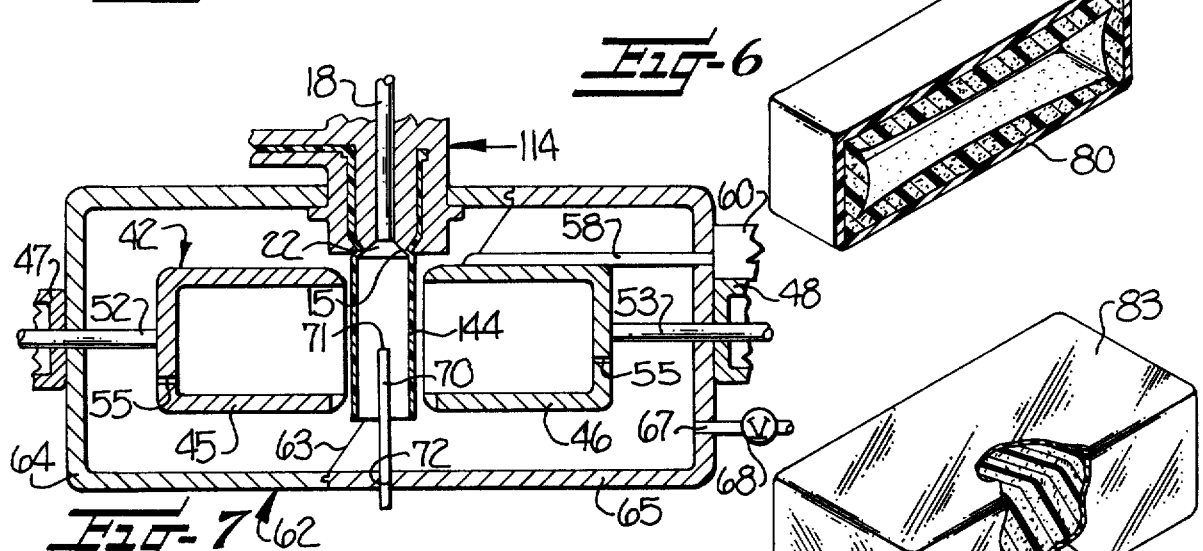
Fig-6
Fig-7
Fig-8
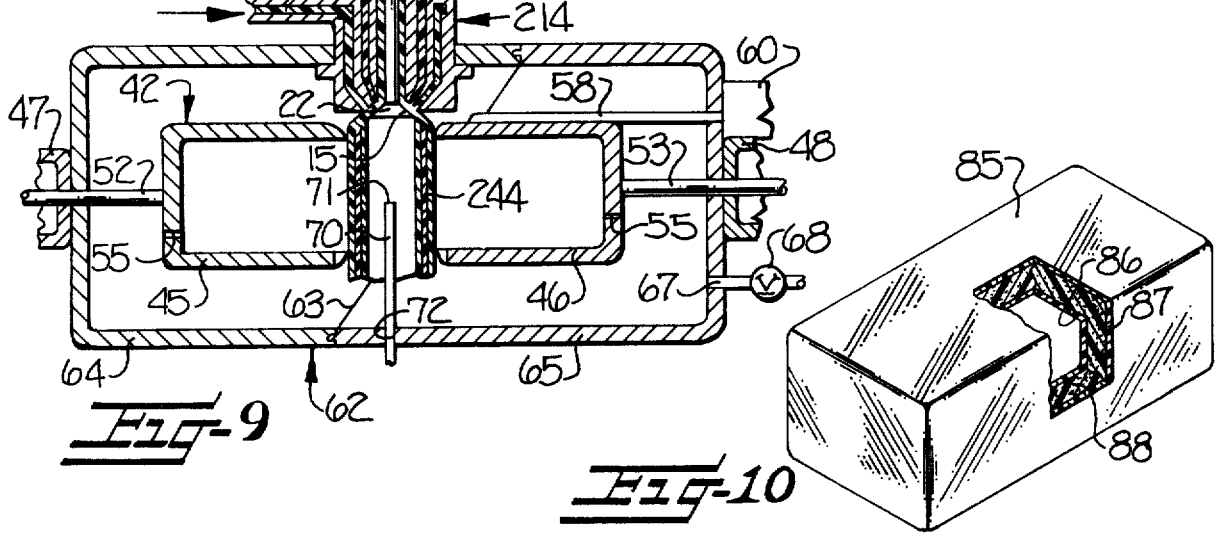
Fig-9
Fig-10

METHOD AND APPARATUS FOR FORMING FOAMED PLASTIC ARTICLES

The present invention relates to a method and apparatus for forming foamed plastic articles which are suitable for use as various ornamental objects, structural members, hollow containers, or the like.

In the conventional extrusion blow molding process, a tubular parison of plastic or other moldable material is extruded into an open mold. The mold is then closed, and air is introduced into the interior thereof to expand the plastic against the wall of the mold to form a desired configuration. While such procedure is satisfactory for molding many different modable materials, it has not been thought possible to mold foamed plastic articles by this process since it is well known that an extruded foamable material commences foaming immediately upon leaving the extruder. As will be apparent, such premature foaming would adversely affect, if not render impossible, the subsequent blow molding operation.

It is accordingly an object of the present invention to provide a method and apparatus for blow molding foamed plastic articles.

It is another object of the present invention to provide a method and apparatus for blow molding foamed plastic articles and which is suitable for molding a variety of articles, including both hollow and solid articles.

It is still another object of the present invention to provide a method and apparatus of the described type and which is suitable for molding articles comprising laminated layers of plastic, at least one of the layers comprising a foamed material and the other layers comprising a non-foamed material to provide a substantially non-porous skin which is laminated to the foamed layer.

These and other objects and advantages of the present invention are achieved in the embodiments illustrated herein by the provision of a method and apparatus which includes an extrusion die which is adapted to extrude a heated foamable plastic material through an annular orifice to form a tubular parison, a mold positioned immediately adjacent the extrusion die for enclosing the parison therewithin, and blowing means adapted to communicate with the interior of the mold for outwardly expanding the parison against the walls of the mold. The prevent the premature foaming of the foamable plastic material, there is also provided means for pressurizing the parison while it is being extruded and positioned within the mold, such pressurizing means comprising a housing which is adapted to sealably encompass the annular orifice of the extrusion die as well as the mold, and a pressurization system to selectively maintain the pressure within the housing at a desired level.

Some of the objects of the invention have been stated, other objects will appear as the description proceeds, when taken in connection with the accompanying drawings, in which:

FIG. 5 is a view of a fragmentary portion of the apparatus shown in FIG. 1, and illustrating the same after the mold and pressure chamber are opened to eject the molded article;

FIG. 6 is a sectioned perspective view illustrating a modified embodiment of the molded article;

FIG. 7 is a view similar to FIG. 1, but showing an alternate embodiment of the present invention wherein the parison comprises a single tubular member;

FIG. 8 is a perspective view, partly broken away, of a molded article adapted to be produced by the apparatus shown in FIG. 7;

FIG. 9 is a view similar to FIG. 1, but showing still another embodiment of the present invention wherein the parison comprises three concentric tubular members;

FIG. 10 is a perspective view, partly broken away, of a molded article adapted to be produced by the apparatus shown in FIG. 9.

Figure 1:
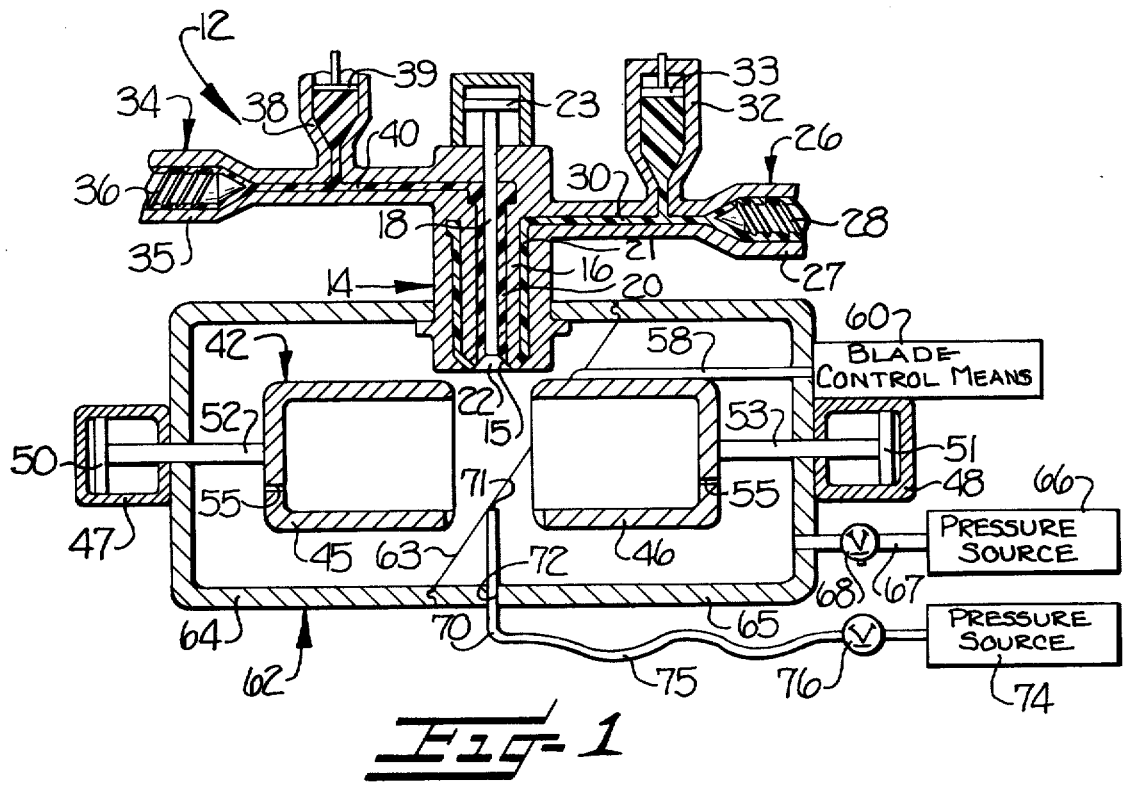
FIG. 1 is a somewhat schematic sectional elevation view of an apparatus embodying features of the present invention, and illustrating the same at the commencement of the cycle of operation.

Referring more particularly to the drawings, FIGS. 1–5 schematically illustrate one embodiment of an apparatus embodying the features of the present invention. The apparatus includes an extruding apparatus generally indicated at 12 which includes an extrusion die 14 having a central bore which defines a circular opening 15 at the lower end. A sleeve 16 is positioned coaxially within the bore of the die 14, and a vertically translatable mandrel 18 is in turn coaxially positioned within the sleeve. By this arrangement, the bore of the die 14, the sleeve 16, and the mandrel 18 together define inner and outer tubular concentric passageways 20 and 21, respectively, the lower ends of the passageways communicating with the opening 15 to define concentric annular orifices.

The lower end of the mandrel 18 includes a conical end portion 22 which is generally aligned with the opening 15, and the upper end of the mandrel includes a suitable piston 23 which is operatively controlled by a suitable hydraulic system or the like (not shown) for raising and lowering the mandrel. As shown in FIG. 1, the mandrel is raised to close the opening 15 and thus also the orifices defined by the passageways 20 and 21.

A heated plastic material may be supplied to the outer passageway 21 from a conventional extruder 26. Generally, the extruder 26 includes a heated cylinder 27 into which a granulated plastic material or the like is fed from a suitable hopper (not shown). A rotating screw 28 is positioned within the cylinder to advance the heated and plasticized material through the channel 30 and into the outer passageway 21 in the die 14. Also, an accumulator 32 communicates with the channel 30, the accumulator 32 including a piston 33 which is raised to fill the same during the blow molding operation and depressed to force the heated plastic into the passageway 21 during the extrusion operation. Where it is desired to extrude a foamable plastic material from the passageway 21, a suitable foaming agent as known in the art may be mixed with the granular plastic material within the extruder in the conventional manner.

A heated plastic material is similarly supplied to the inner passageway 20 from a second extruder 34. The second extruder is generally similar to the extruder 26, and includes a heated cylinder 35, a rotating screw 36, and a second accumulator 38 having a piston 39 and which communicates with the channel 40 leading to the passageway 20.

Figure 2:
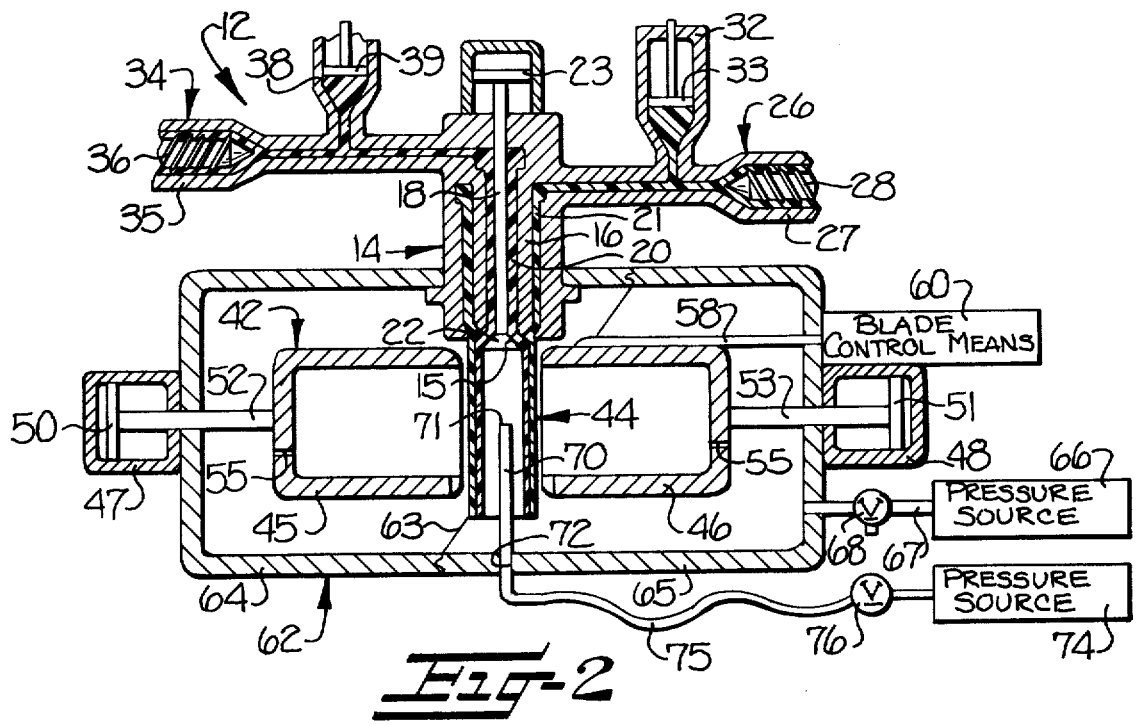
FIG. 2 is similar to FIG. 1, and illustrating the apparatus after having extruded the tubular parison.

A mold 42 is positioned immediately below the die 14 to enclose the extruded parison 44 therewithin. More particularly, the mold 42 comprises a pair of opposed concave wall sections 45 and 46, and hydraulic or other similar means generally indicated at 47 and 48, and including the pistons 50 and 51 and connecting rods 52 and 53, respectively, for translating the wall sections toward and away from each other. Thus as seen in FIGS. 1 and 2, the wall sections 45 and 46 are spaced apart to receive the extruded parison 44, while in FIGS. 3 and 4, the wall sections are contiguous or closed to define a mold cavity therewithin. For the reasons to become apparent, the wall sections of the mold may include one or more apertures 55 extending through the wall thereof.

The apparatus of the present invention further includes a translatable knife blade 58 mounted intermediate the lower end of the die 14 and the mold 42. The knife blade is adapted to be translated along a linear path to cut the parison 44 as hereinafter further described, the blade being translated by a suitable mechanism schematically shown at 60.

To pressurize the parison while it is being extruded and positioned within the mold, there is provided pressurizing means comprising a split chamber or housing 62 which is adapted to sealably encompass the lower end of the die 14 (and thus the annular orifices defined by the passageways 20 and 21). Also, the housing 62 will be seen to encompass the wall sections 45 and 46 of the mold 42. The housing 62 is split along the inclined joint 63, and the two halves 64 and 65 thereof may be translated toward and away from each other by suitable means (not shown) between the position shown in FIGS. 1-4, and the position shown in FIG. 5. The interior of the housing is operatively connected to the pressure source schematically indicated at 66 via the tube 67 and valve 68.

Figure 3:
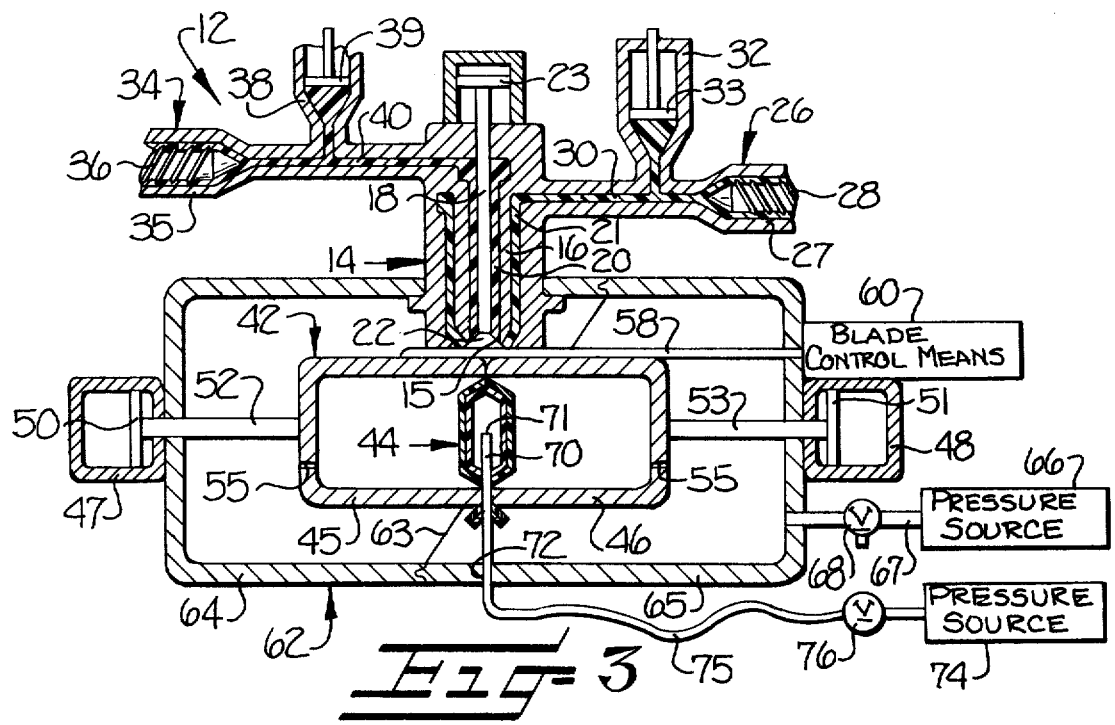
FIG. 3 is a view similar to FIG. 1, and illustrating the apparatus after the mold has closed about the tubular parison.
Figure 4:
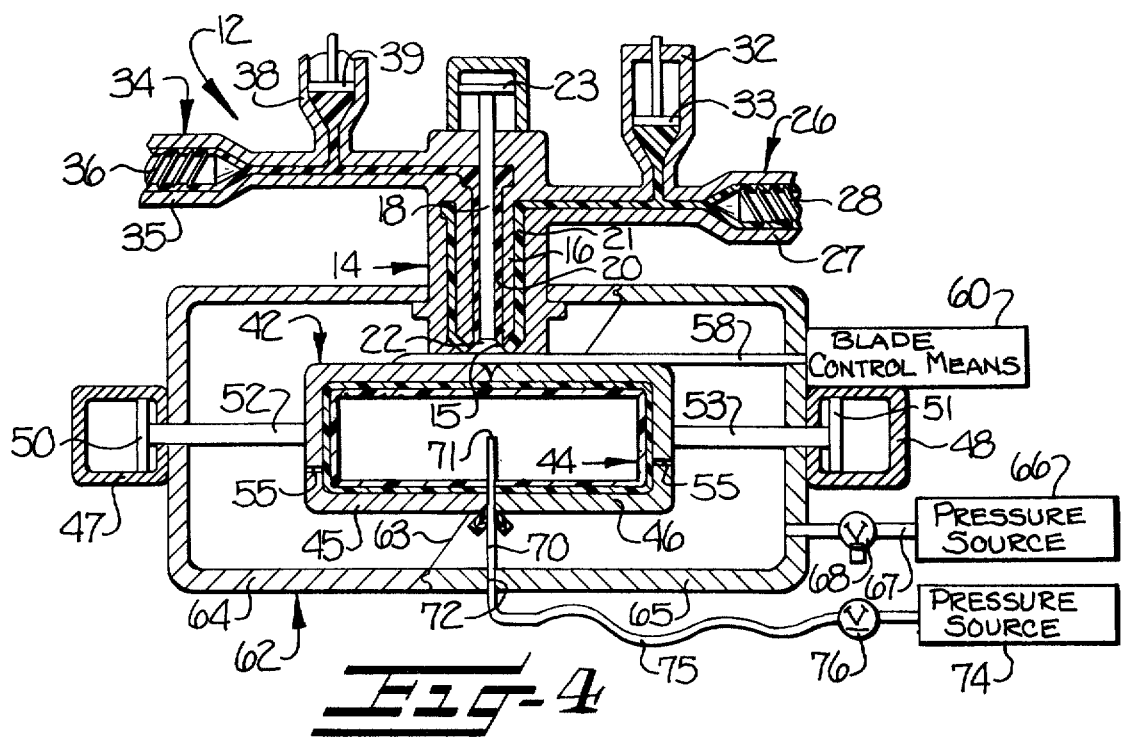
FIG. 4 is a view similar to FIG. 1, and illustrating the apparatus after the blow molding operation and prior to foaming.

The blowing means for the illustrated apparatus comprises a tubular core pin 70 defining a forward end 71 which is adapted to extend through an aperture 72 in the housing half 65 and between the wall sections 45 and 46 of the closed mold 42 as shown in FIGS. 3 and 4. The pin 70 is operatively connected to a suitable pressure source 74 via the flexible connecting tube 75 and valve 76, and the pin is mounted for axial translation between an extended position wherein the forward end 71 is positioned within the cavity of the mold 42, and a withdrawn position (as seen in FIG. 1) free of all contact with the mold.

The operation of the apparatus shown in FIGS. 1-5 is illustrated by the sequence of the figures. More particularly, FIG. 1 shows the apparatus ready to commence the extrusion operation, and it will be noted that both of the accumulators 32 and 38 are substantially charged and the mandrel 18 is raised to close the opening 15 and thus also the annular orifices defined by the passageways 20 and 21. To commence the extrusion operation, the mandrel 18 is lowered to open the orifices, and the pistons 33 and 39 in the two accumulators are depressed to force the accumulated plastic material into the die 14 and the associated passageways 20 and 21. The heated plastic material from the extruder 26 is thus extruded through the annular orifice defined by the lower end of the passageway 21, while the heated plastic material from the extruder 34 is extruded through the annular orifice defined by the lower end of the passageway 20. The parison 44 which is formed thus comprises a pair of contiguous concentric tubular members as shown in FIG. 2.

Typically, the plastic material in one of the extruders 26 and 34 includes a foaming agent such that one of the tubular members of the parison 44 comprises a foamable plastic material. In the embodiment of FIGS. 1-5, the plastic material delivered from the extruder 34 is a heated foamable plastic material such that inside tubular member of the parison 44 is foamable. However, the parison is maintained under a sufficient pressure to prevent the foaming of the plastic material during the extrusion and blow molding operations by a positive pressure which is maintained within the housing 62 from the pressure source 66.

When the parison 44 is fully extruded as shown in FIG. 2, the core pin 70 is translated upwardly such that its forward end 71 is positioned centrally within the parison. Also, the mandrel 18 is lifted such that the conical end portion 22 closes the annular orifices. The knife blade 58 is then translated across the lower end of the die 14 to cut the parison, and the wall sections 45 and 46 of the mold 42 are brought together to the closed position shown in FIG. 3. It will be understood that the lower ends of the wall sections 45 and 46 are suitably shaped to admit the core pin 70 therebetween when closed as shown in the drawings.

After the mold has closed, the parison 44 is blow molded against the walls thereof to form the plastic material into a desired configuration. More particularly, the parison is formed into contiguous layers with the layer of the non-foamable plastic material positioned against the wall of the mold and the layer of the foamable plastic material on the inside thereof, note FIG. 4. This blow molding operation is accomplished by directing pressurized air from the source 74 through the core pin 70 and into the interior of the mold. It will be noted that the openings 55 in the wall sections of the mold serve to permit the release of the air trapped between the parison and the walls of the mold. In addition, it will be understood that the pressure within the mold is maintained at a level to prevent the foaming of the foamable plastic material by the pressure maintained within the housing 62 from the pressure source 66, and that the pressure from the source 74 will necessarily be substantially greater than the pressure from the source 66 to permit expansion of the parison.

To cause the foamable plastic material to foam, the pressure within the mold 42 and the housing 62 may be released by appropriately setting the valves 68 and 76. The resulting reduction in pressure within the mold permits the foamable plastic material to foam and expand to fill the interior of the mold to form, for example, a solid plastic article 78 as shown in FIG. 5. Upon completion of or during the foaming action, the core pin 70 is withdrawn from the mold, and the wall sections of the mold 42 as well as the two halves of the housing 62 are laterally withdrawn to open the mold and thereby permit the article to be withdrawn, note FIG. 5.

It will be understood that the amount and composition of the foamable plastic material in the parison will determine whether the foamed plastic will completely fill the interior of the mold as shown in the article 78, or whether it will fill only a portion of the interior of the mold. In the latter case, a hollow plastic article 80 as shown in FIG. 6 may be produced. In either case, a plastic article results which comprises a smooth, non-porous outer layer and a foamed inner layer which adds to the strength and rigidity thereof.

A second embodiment of the present invention is shown in FIG. 7 wherein the extrusion die 114 includes a single annular orifice such that the parison 144 comprises a single tubular member. All other components of the apparatus shown in FIG. 7 are similar to the components described above with reference to FIGS. 1–5. The plastic material in the parison 144 typically includes a blowing agent, and it will be apparent that the extruded foamable plastic material will be expanded to directly contact the wall of the mold during the blow molding operation. Normally, the mold will be at a relatively low temperature compared to that of the plastic material so that the plastic material is solidified upon contact with the walls to form a substantially non-porous relatively thin skin 82 about the periphery of the molded article 83 as shown in FIG. 8. If desired, a suitable cooling apparatus (not shown) could be employed to maintain the walls of the mold at a desired temperature to insure the formation of a skin. As in the prior embodiment, the article 83 may be either solid or hollow depending upon the amount and composition of the foamable plastic material employed.

Still another embodiment of the present invention is shown in FIG. 9 wherein the extrusion die 214 includes three annular orifices such that the parison 244 comprises three concentric tubular members. Typically, the intermediate tubular member will comprise a foamable plastic material while the other two tubular members comprise a non-foamable plastic material. This construction results in an article 85 as shown in FIG. 10 wherein the inner and outer surfaces comprise smooth non-porous layers 86 and 87 respectively of the non-foamed plastic material, while the intermediate layer 88 is foamed. This construction has been found to be useful in the manufacture of liquid containers and the like.

It will be understood that a variety of conventional plastic materials and blowing agents are suitable for use with the present invention. Examples of typical plastic materials comprise various thermoplastic materials such as polyethylene, polyurethane, polystyrene, polyvinyl chloride, and the like. The blowing agent typically comprises a gas such as nitrogen, carbon dioxide, Freon or pentane which is dissolved with the plastic material in the extruder under conditions of elevated temperature and pressure. When the pressure is released, the gas is liberated and forms bubbles in the material to provide the foaming action. During the extrusion operation, these materials are typically maintained at a pressure of between about 400 to 3,000 psi or higher, and at a temperature of between about 180° to 400°F. Also, various conventional additives such as stabilizers, pigments, and the like may be employed with the plastic material.

It will also be understood that where the parison comprises two or more tubular members, the plastic material in the different tubular members may be of different chemical compositions to provide desirable physical properties in the resulting molded articles. However, it is generally preferable that the tubular members of the parison be adhesively compatible such that the contiguous layers formed during the blow molding operation are laminarly bonded together.

While the molded articles 78, 80, 83, and 85 are illustrated in the drawings as being generally rectangular, it will be appreciated that various configurations may be molded employing the method and apparatus of the present invention. In addition, it will be apparent that where a hollow object is being molded, it may be desirable to form a mouth or other opening into the interior of the article. This may be readily accomplished by suitably shaping the wall sections of the mold 42.

In the drawings and specification, there has been set forth a preferred embodiment of the invention, and although specific terms are employed, they are used in a generic and descriptive sense only and not for purposes of limitation.

That which is claimed is:

1. A method for molding plastic articles comprising the steps of extruding a hot foamable plastic material through an annular orifice to form a tubular parison while maintaining the plastic material under sufficient positive pressure to prevent the foaming thereof, enclosing the parison within a mold while continuing to maintain the plastic material under sufficient positive pressure to prevent the foaming thereof, blow molding the parison against the walls of the enclosing mold to form the plastic material into a desired configuration while continuing to maintain the plastic material under sufficient positive pressure to prevent the foaming thereof, then releasing the positive pressure to cause the plastic material to foam, and opening the mold to release the molded plastic article.

2. The method as defined in claim 1 wherein the step of releasing the pressure is accomplished while the plastic remains in the mold.

3. The method as defined in claim 2 comprising the further step of extruding a hot non-foamable plastic material concurrently with the extruding of the foamable plastic material and through a second annular orifice positioned concentric with and immediately adjacent to the annular orifice through which the foamable material is extruded, such that the parison comprises a first tubular member of foamable plastic material and a second tubular member of non-foamable plastic material positioned concentric with and immediately adjacent to the first tubular member.

4. The method as defined in claim 3 wherein the step of extruding a hot non-foamable plastic material includes positioning the same outside of the foamable plastic material such that the non-foamable tubular member of the parison is positioned outside of the foamable tubular member thereof.

5. The method as defined in claim 3 wherein the step of extruding a hot non-foamable plastic material includes positioning the same inside the foamable plastic material such that the non-foamable tubular member of the parison is positioned inside the foamable tubular member thereof.

6. The method as defined in claim 1 wherein the step of extruding the hot foamable material includes coordinating the amount extruded with the size of the mold such that the extruded foamable plastic material expands to fill the interior of the mold upon the pressure being released to thereby form a solid plastic article.

7. The method as defined in claim 1 wherein the step of extruding the hot foamable material includes coordinating the amount extruded with the size of the mold such that the extruded foamable plastic material expands to fill only a portion of the interior of the mold upon the pressure being released to thereby form a hollow plastic article.

8. The method as defined in claim 1 wherein the step of enclosing the parison in a mold includes maintaining the walls of the mold at a relatively low temperature such that the foamable plastic material is solidified upon contact with the walls to form a substantially non-porous skin about the periphery of the molded article.

9. A method of molding layered plastic articles comprising the steps of extruding a hot foamable plastic material through a first annular orifice, while extruding a hot non-foamable plastic material through a second annular orifice positioned concentric with and immediately adjacent to the first annular orifice such that the extruded foamable plastic material and extruded non-foamable plastic material form a parison comprising a pair of concentric tubular members, while maintaining the parison under sufficient positive pressure to prevent the foaming of the extruded foamable plastic material, enclosing the parison within a mold while continuing to maintain the parison under sufficient positive pressure to prevent the foaming of the extruded foamable plastic material, blow molding the parison against the walls of the enclosing mold to form the same into a desired configuration comprising contiguous layers of the foamable plastic material and the non-foamable plastic material and while continuing to maintain the parison under sufficient positive pressure to prevent the foaming of the foamable plastic material, then releasing the positive pressure to cause the foamable plastic material to foam, and opening the mold to permit removal of the molded plastic article.

10. The method as defined in claim 9 wherein the hot foamable and non-foamable plastic materials are adhesively compatible such that the contiguous layers formed during the blow molding operation are laminarly bonded together.

11. The method as defined in claim 9 wherein the step of blow molding the parison includes directing pressurized air into the interior thereof.

12. The method as defined in claim 9 wherein the step of extruding a hot non-foamable plastic material includes positioning the same outside the foamable plastic material such that the non-foamable plastic material contacts the walls of the mold.

13. The method as defined in claim 12 comprising the further step of extruding a second non-foamable plastic material concurrently with the extrusion of the other non-foamable plastic material and the foamable plastic material and through a third annular orifice positioned concentric with and immediately adjacent to and inside the first annular orifice such that the parison comprises three concentric tubular members and with the foamable plastic material comprising the intermediate member, and three contiguous layers are formed during the blow molding operation.

* * * * *